(No Model.)
J. H. & J. A. KIMBRO.
PLANTER.
No. 315,635. Patented Apr. 14, 1885.
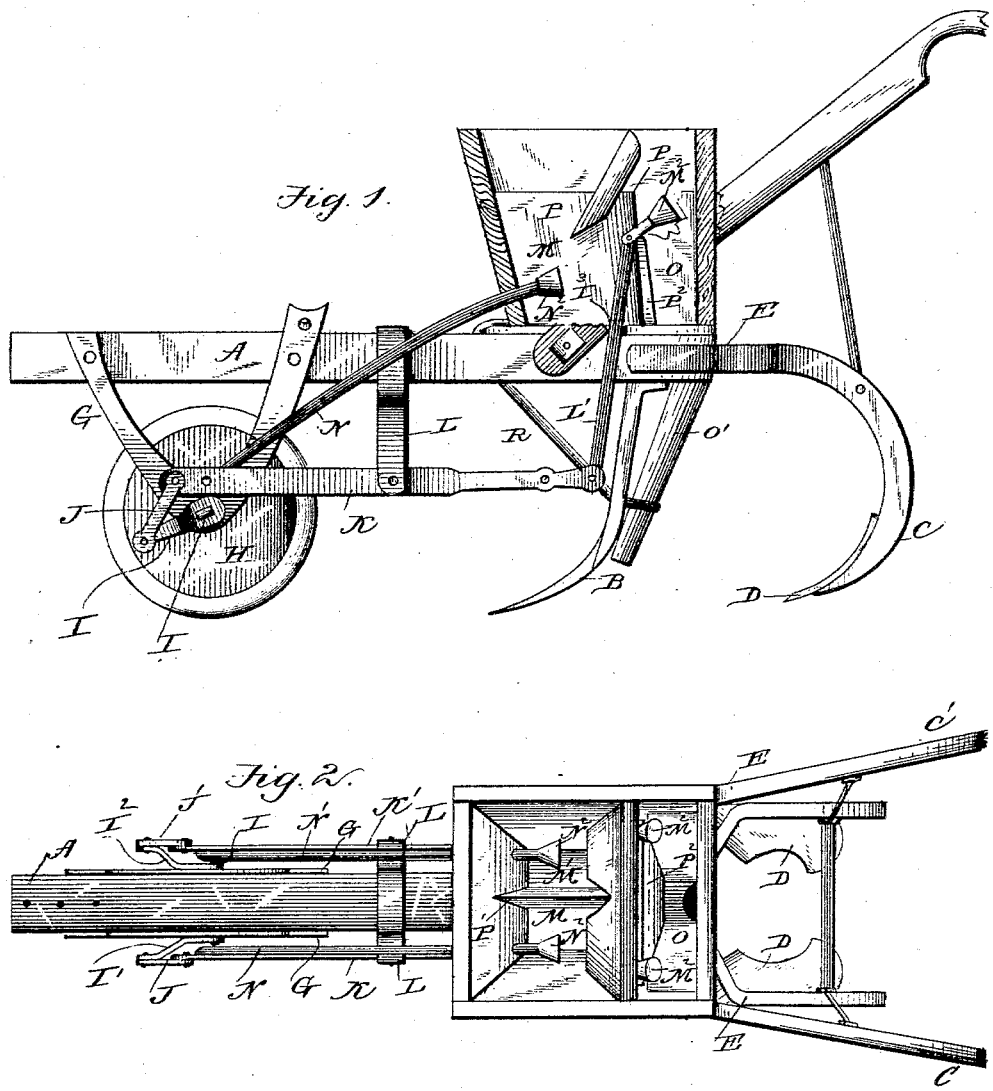
WITNESSES
INVENTOR
John H. Kimbro
Jerymiah H. Kimbro
By C. A. Snow & Co.
Attorney

UNITED STATES PATENT OFFICE.

JERRYMIRAH HADEN KIMBRO AND JOHN ALBURT KIMBRO, OF GEORGETOWN, TEXAS.

PLANTER.

SPECIFICATION forming part of Letters Patent No. 315,635, dated April 14, 1885.

Application filed September 16, 1884. (No model.)

*To all whom it may concern:*

Be it known that we, JERRYMIRAH H. KIMBRO and JOHN A. KIMBRO, citizens of the United States, residing at Georgetown, in the county of Williamson and State of Texas, have invented a new and useful Improvement in Planters, of which the following is a specification, reference being had to the accompanying drawings.

Our invention has relation to seed-planters; and it consists in the construction and novel arrangement of parts, as will be hereinafter fully described, and particularly pointed out in the claims.

In the drawings, Figure 1 is a side elevation, partly in section. Fig. 2 is a plan view.

Referring by letter to the accompanying drawings, A designates the beam of the planter, which is provided with the opening-plow B and the two covering-plows C C'. The opening-plow B is secured to the planter-beam A near the rear end thereof, and to the under face thereof. The shanks E of the covering-plows are secured to the sides of the beam A at its rear end, and diverge rearwardly for a short distance, and then curve downwardly, rearwardly, and then forwardly, and the plows D are secured to the lower ends of the shanks E, and arranged to turn the dirt toward the furrow just made by the opening-plow. Adjustable hangers G G are provided near the forward end of the planter-beam A, and in these hangers is journaled the driving-wheel H of the planter. The shaft I of the driving-wheel H is provided on its end with crank-arms I' and I². These crank-arms project radially from the shaft in nearly opposite directions, and are connected by link-arms J J' to the forward ends of oscillating levers K K', fulcrumed on a shaft supported in bearings in the lower ends of the hanger-arms L L', connected to the planter-beam a short distance in front of the opening-plow B. To the rear ends of the oscillating levers K K' are pivoted the lower ends of arms L L', which extend up through openings L² in the bottom of the hopper into the compartments M M' of the hopper, and are provided with hinged seed-cups M² at their upper ends. Rods N N' are pivoted to the oscillating levers K K' near their forward ends, and incline rearwardly and upwardly, and enter the seed-compartments M M' of the hopper. The rods N N' are provided at their upper ends, within the hopper, with rigid seed-cups N² N². The compartment O is in the rear of the compartments M M', and communicates with the discharge-tube O' in rear of the opening-plow B. A partition, P, traverses the hopper laterally near the rear end of the hopper, and extends only part way up the sides of the hopper. The sides of the compartment O are inclined toward the mouth of the discharge-tube, and direct the seed to the discharge-opening. A partition, P', divides the hopper in front of the partition P into the seed-compartments M M', and an inclined guard, P², traverses the hopper laterally above and in front of the partition P, and deflects the pivoted seed-cups M², and causes them to discharge their contents into the compartment O, whence it passes through the discharge-tube to the furrow in rear of the opening-plow. The cups N² N² upon the ends of the rods N N' agitate the seed in the compartments M M', and the alternating seed-cups M² take it in the proper quantity to form a hill and drop it into the rear compartment, O, whence it passes through the discharge-tube to the furrow and is covered by the covering-plows. The oscillating levers K K' are provided near their rear ends with perforations to permit of the adjustment of the arms L L' to regulate the distance between the hills in the row to be planted.

It will be observed that while the rigid cups act as agitators, the hinged cups take the seed from the hopper-compartments and drop it into the discharge-compartment, whence it passes through the discharge-tube into the furrow behind the opening-plow, and is covered by the covering-plows. The discharge-tube is braced near its lower end by a rod, R, extending from the plow-beam rearwardly through the shank of the opening-plow, and having a ring at its lower end, which encircles the discharge-tube near its lower end.

We are aware that a seed-planter having a hopper divided into a seed-compartment and a discharge-compartment, oscillating levers connected to and operated by a cranked wheel, and rods having seed-cups that are secured to the oscillating levers and operate in the discharge-compartment of the hopper, is not broadly new, and this, broadly, we disclaim.

Having thus fully described our invention, what we claim as new, and desire to secure by Letters Patent of the United States, is—

1. The combination, with the plow-beam having the hopper provided with two seed-compartments and a discharge-compartment, of the oscillating levers fulcrumed in hangers beneath the plow-beam, the rods provided with fixed cups, and the rods provided with the hinged cups, and the cranked wheel for operating the levers, substantially as specified.

2. The combination, with the plow-beam having the hopper provided with the seed-compartments and the discharge-compartment, of the oscillating levers, the rods with rigid cups, rods with hinged cups, the opening-plow, discharge-tube, and the covering-plows, substantially as specified.

3. The combination, in a seed-planter, of the oscillating levers having pivoted rods with rigid cups at their upper ends, and pivoted rods with hinged cups at their upper ends, and a crank-wheel connected to said levers, as set forth.

In testimony that we claim the foregoing as our own we have hereto affixed our signatures in presence of two witnesses.

JERRYMIRAH HADEN KIMBRO.
JOHN ALBURT KIMBRO.

Witnesses:
 GIDEON PURL,
 J. S. HUNT.